(No Model.)

K. H. GRANGER.
HANDLE FOR TOOLS AND BICYCLE HANDLE BARS.

No. 588,794. Patented Aug. 24, 1897.

WITNESSES:

INVENTOR
K H Granger
BY
ATTORNEYS.

UNITED STATES PATENT OFFICE.

KARLE H. GRANGER, OF SOUTH WEYMOUTH, MASSACHUSETTS.

HANDLE FOR TOOLS AND BICYCLE HANDLE-BARS.

SPECIFICATION forming part of Letters Patent No. 588,794, dated August 24, 1897.

Application filed August 11, 1896. Serial No. 602,406. (No model.)

*To all whom it may concern:*

Be it known that I, KARLE H. GRANGER, of South Weymouth, in the county of Norfolk and State of Massachusetts, have invented a new and Improved Handle for Tools and Bicycle Handle-Bars, of which the following is a full, clear, and exact description.

The object of the invention is to provide a flexible or yielding hand-grip for tools and bicycle handle-bars of such construction that the vibratory movement of the handle or object grasped will not be communicated to the operator or to the rider of a bicycle and whereby the operator or rider will have a cushioned grip-surface, which surface will consist of a series of inflatable members usually placed in spiral arrangement.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
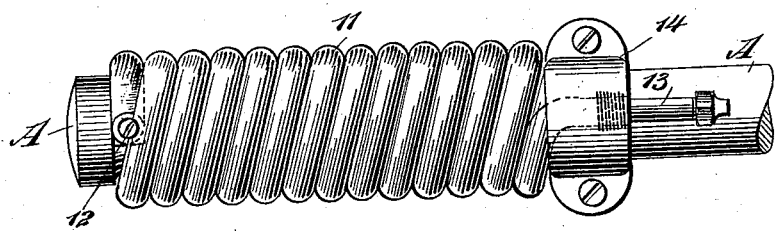
Figure 2:
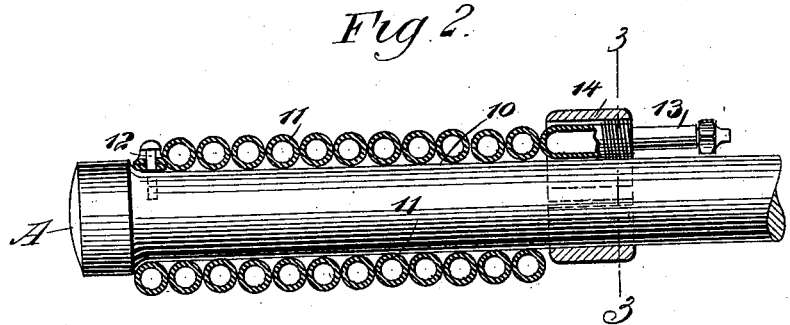
Figure 3:
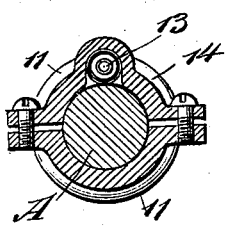

Figure 1 is a side elevation of the handle portion of the handle-bar for a bicycle to which the improvement is applied. Fig. 2 is a vertical section through the attachment, the handle-section of the handle-bar being shown in side elevation; and Fig. 3 is a vertical section taken substantially on the line 3 3 of Fig. 2.

In carrying out the invention I have illustrated the application of the improvement to the handle-section A of the handle-bar of a bicycle, but it will be understood that the application of the invention may be made with equally good results to the handle of any tool, which handle is susceptible to a vibratory movement when said tool is in use. The handle-section A is preferably reduced in diameter, as shown at 10 in the drawings, from a point near its outer end to a point at or near its inner extremity, and the said reduced portion of the handle is wrapped around by a tubing 11, which at its outer end is attached by a pin 12, bolt, clip, or its equivalent to the handle, and the inner end of the said tubing, which is in spiral arrangement around the handle, is carried through a sleeve or a clamp 14 of any approved description and which is secured to the body of the tool-handle at the termination of its grip portion or to the handle-bar of a bicycle at the termination of the grip portion of the same. The inner end of the tube 11 is provided with a valve 13, which is secured to the tube in any suitable or approved manner and extends inwardly beyond the clip 14. The tube 11 is adapted to be inflated with air, water, or any material capable of imparting to the coils of the tube an elastic character, and the said air, water, or its equivalent is introduced into the coil through the valve 13, which may be at either end of the coil. It is therefore evident that the gripping-surface of a bicycle handle-bar or the handle of a tool of any description may be formed in an economic manner and so that any vibration which the handle-bar or the tool may be subjected to will not be imparted to the person holding the tool or handle-bar to any appreciable extent.

I desire it to be understood that I do not confine myself to any particular material for the construction of the coil, or the shape of the handle, or the dimensions of the coil and handle, or the manner in which the tube shall be placed on the handle. Furthermore, I do not confine myself to the manner in which the tube shall be attached to the handle, or the degree to which the tube shall be inflated, or the number of chambers which may be contained in the tube which surrounds the handle, and that if in practice it is found desirable a covering or envelop of any desired character may be placed over the inflatable coil for the handle to render the same smooth to the grasp.

The cushion shown upon the handle-bar may be used in practically the same or slightly-altered shape to divert jar from any portion of the body. The inflated coil may be used for carriage-cushions to take the jar of rough roads. It may also be used to take up the jar of machinery by interposing the cushion between the vibrating machine and the body against which the piece of work is held. Likewise the coiled tube may be applied to bicycle-pedals or foot-cushions, thereby relieving the whole body from jarring.

Having thus described my invention, I claim as new and desire to secure by Letters Patent—

1. The combination with the handle of the handle-bar for a bicycle or other wheeled vehicle, or the handle of a tool, of an inflatable tube wound helically about said handle, substantially as shown and described.

2. A hand-grip for a tool-handle or the handle-bar for a bicycle or other wheeled vehicle, consisting of an inflatable tube wound around the said handle, substantially as shown and described.

3. The combination, with the handle of the handle-bar for a bicycle or other wheeled vehicle, or the handle of a tool, of an inflatable tube wound around the said handle and provided with a valve at one of its ends, whereby the said tube may be inflated, as and for the purpose specified.

4. The combination, with the handle of the handle-bar of a bicycle or other wheeled vehicle, or the handle of a tool, of a tube attached at one end to the said handle and wound spirally thereon, the opposite end of the tube being provided with a valve, and a clamp holding the valved end of the tube to the said handle, as and for the purpose set forth.

5. The handle of a handle-bar for a bicycle, or other wheeled vehicle, or the handle of a tool, having a prepared surface near one end and a tube attached at one end to the said handle and wound spirally around the same, the opposite end of the tube terminating in a valve, and a clamp engaging with the valved end of the tube and with the handle, holding the valved end of the tube upon the said handle in a fixed position, as and for the purpose specified.

KARLE H. GRANGER.

Witnesses:
FRED L. BAYLY,
QUINCY L. REED.